(12) United States Patent
Larsen

(10) Patent No.: US 7,224,081 B2
(45) Date of Patent: May 29, 2007

(54) VOLTAGE CONTROL FOR WIND GENERATORS

(75) Inventor: Einar V. Larsen, Charlton, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/484,513

(22) Filed: Jul. 10, 2006

(65) Prior Publication Data
US 2006/0255594 A1    Nov. 16, 2006

Related U.S. Application Data

(62) Division of application No. 10/655,514, filed on Sep. 3, 2003.

(51) Int. Cl.
*F03D 9/00* (2006.01)
*H02P 9/04* (2006.01)

(52) U.S. Cl. .......................... 290/44; 290/55

(58) Field of Classification Search ................ 290/44, 290/55, 54, 43; 405/7, 2, 42, 907; 416/1; 415/4.5
See application file for complete search history.

(56) References Cited

U.S. PATENT DOCUMENTS

| | | |
|---|---|---|
| 4,251,735 A | 2/1981 | Coleman |
| 4,350,947 A | 9/1982 | Uenosono et al. |
| 4,400,659 A * | 8/1983 | Barron et al. .................. 322/32 |
| 4,607,206 A | 8/1986 | Sember et al. |
| 5,225,712 A * | 7/1993 | Erdman ........................ 290/44 |
| 5,798,633 A | 8/1998 | Larsen et al. |
| 5,808,499 A | 9/1998 | Behbahani et al. |
| 5,886,417 A | 3/1999 | Oka et al. |
| 6,107,784 A | 8/2000 | Nomiya et al. |
| 6,265,852 B1 | 7/2001 | Kitamura et al. |
| 6,327,162 B1 | 12/2001 | Larsen et al. |
| 6,456,056 B1 | 9/2002 | Katoh et al. |
| 6,479,907 B1 | 11/2002 | Eriksson et al. |
| 6,512,966 B2 * | 1/2003 | Lof et al. .................. 700/291 |
| 6,566,764 B2 | 5/2003 | Rebsdorf et al. |
| 6,590,366 B1 | 7/2003 | Browning et al. |
| 6,700,356 B1 | 3/2004 | Dorn |
| 6,762,592 B2 | 7/2004 | Noguchi et al. |
| 6,815,932 B2 | 11/2004 | Wall |

(Continued)

FOREIGN PATENT DOCUMENTS

DE    196 20 906 C2    1/1998

(Continued)

OTHER PUBLICATIONS

H. Lefebvre et al., "Secondary Coordinated Voltage Control System: Feedback of EDF," 2000 Power Engineering Society Summer Meeting, Jul. 2000, pp. 290-295, vol. 1.

*Primary Examiner*—Julio C. Gonzalez
(74) *Attorney, Agent, or Firm*—Blakely, Sokoloff, Taylor & Zafman LLP

(57) ABSTRACT

A wind turbine generator control system includes relatively fast regulation of voltage near the individual generators with relatively slower overall reactive power regulation at a substation or wind farm level. The setpoint of the relatively fast voltage regulator is adjusted by the relatively slow reactive power regulator. The fast voltage regulation can be at the generator terminals or at a synthesized remote point.

5 Claims, 5 Drawing Sheets

U.S. PATENT DOCUMENTS

| | | |
|---|---|---|
| 6,856,038 B2 * | 2/2005 | Rebsdorf et al. ............. 290/44 |
| 6,856,039 B2 | 2/2005 | Mikhail et al. |
| 6,870,350 B2 | 3/2005 | Garrigan et al. |
| 6,924,565 B2 | 8/2005 | Wilkins et al. |
| 7,015,595 B2 * | 3/2006 | Feddersen et al. ............ 290/44 |
| 7,095,130 B2 * | 8/2006 | Ichinose et al. ............. 290/44 |
| 2003/0015876 A1 | 1/2003 | Ichinose et al. |
| 2003/0151259 A1 | 8/2003 | Feddersen et al. |
| 2003/0227172 A1 | 12/2003 | Erdman et al. |
| 2004/0070359 A1 | 4/2004 | Dohnal et al. |
| 2005/0040655 A1 | 2/2005 | Wilkins et al. |
| 2005/0042098 A1 | 2/2005 | Wobben |
| 2005/0200133 A1 * | 9/2005 | Wobben ...................... 290/55 |
| 2006/0028025 A1 * | 2/2006 | Kikuchi et al. ............... 290/44 |

FOREIGN PATENT DOCUMENTS

WO     WO 03/030329 A1     4/2003

* cited by examiner

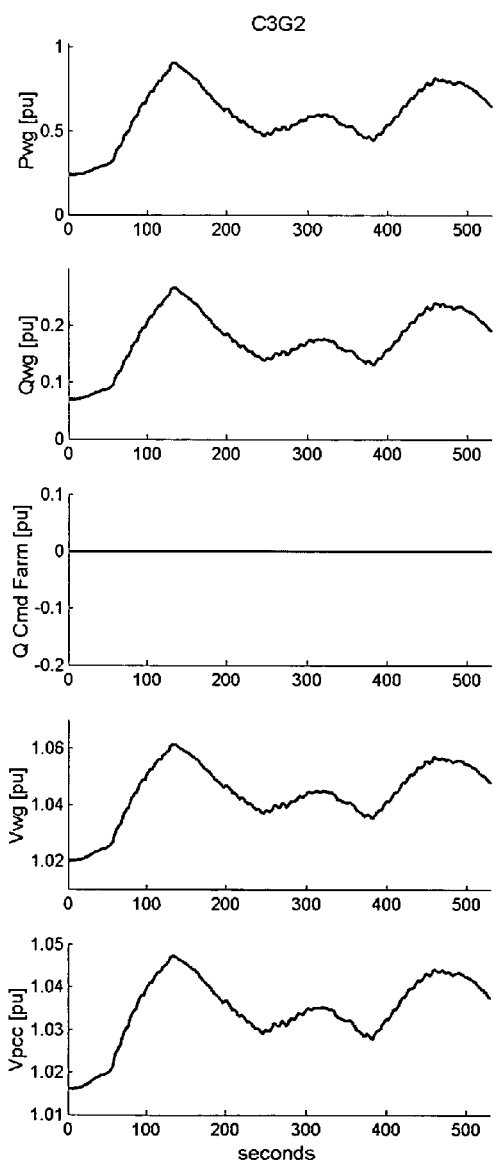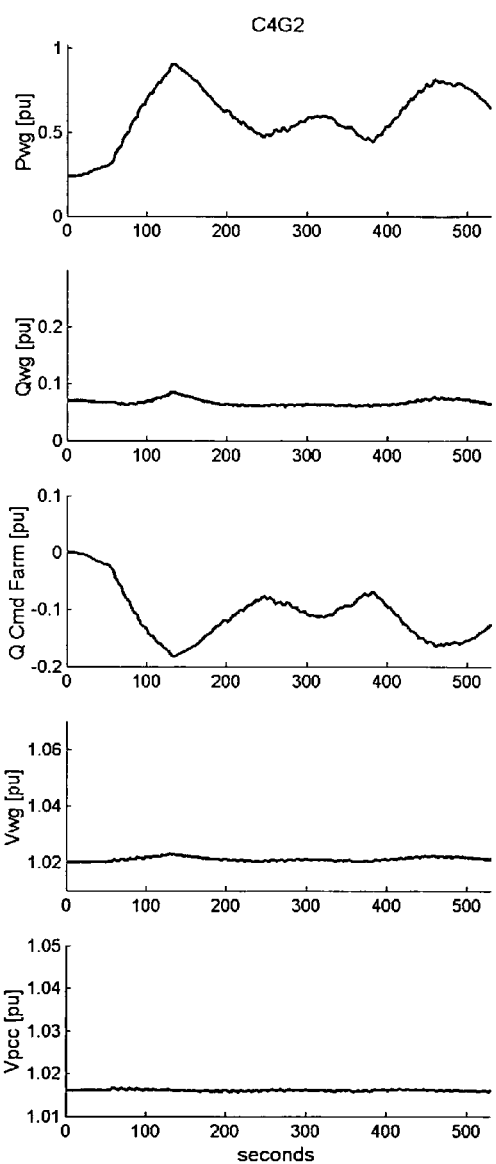
Fig. 4
PRIOR ART
Fig. 5
PRIOR ART

VOLTAGE CONTROL FOR WIND GENERATORS

This application is a divisional of U.S. patent application Ser. No. 10/655,514 filed Sep. 3, 2003.

FIELD

The invention relates to wind turbine generators. More particularly, the invention relates to voltage control systems and techniques for use with wind turbine generators having continuous control of reactive power for at least part of the reactive power compensation function.

BACKGROUND

Wind power generation is typically provided by a wind "farm" of a large number (often 100 or more) wind turbine generators. Individual wind turbine generators can provide important benefits to power system operation. These benefits are related to mitigation of voltage flicker caused by wind gusts and mitigation of voltage deviations caused by external events.

In a wind farm setting each wind turbine generator can experience a unique wind force. Therefore, each wind turbine generator can include a local controller to control the response to wind gusts and other external events. Prior art wind farm control has been based on one of two architectures: local control with constant power factor and farm level control in fast voltage control, or local control in constant voltage control with no farm level control.

Both of these prior art control architectures suffer from disadvantages. Local control with constant power factor and farm level control in fast voltage control requires fast communications with aggressive action from the farm level to the local level. If the farm level control is inactive the local control can aggravate voltage flicker. With constant voltage control on each generator, steady-state operation varies significantly with small deviations in loading on the transmission grid. This causes the wind turbine generators to encounter limits in steady-state operation that prevent a response to disturbances—resulting in a loss of voltage regulation. Because reactive current is higher than necessary during this mode of operation, overall efficiency of the wind turbine generator decreases.

SUMMARY

A wind turbine generator control system includes a reactive power regulator to control reactive power production by the wind turbine generator by adjusting voltage setpoint to a voltage regulator, the reactive power regulator having a first time constant and a voltage regulator coupled with the reactive power controller to control real power production by one or more wind turbine generators, the voltage regulator having a second time constant. The first time constant is numerically greater than the second time constant.

BRIEF DESCRIPTION OF THE DRAWINGS

The invention is illustrated by way of example, and not by way of limitation, in the figures of the accompanying drawings in which like reference numerals refer to similar elements.

FIG. 4 is an example set of waveforms corresponding to a prior art local control with constant power factor without wind farm level control.

FIG. 5 is an example set of waveforms corresponding to a prior art local control with constant power factor and wind farm level control in fast voltage control.

DETAILED DESCRIPTION

A wind turbine generator control system includes relatively fast regulation of voltage for individual generators with relatively slower overall reactive power regulation at a substation or wind farm level. The relatively slow reactive power regulator adjusts the set point of the relatively fast voltage regulator. The fast voltage regulation can be at the generator terminals or at a synthesized remote point (e.g., between the generator terminals and the collector bus). Prior art reactive power controllers are designed with time constants of lower numerical value than those used in voltage regulator design. That is, in the prior art, the reactive power control loop is inside of the voltage control loop, which results in a less stable system than described herein.

Figure 1:
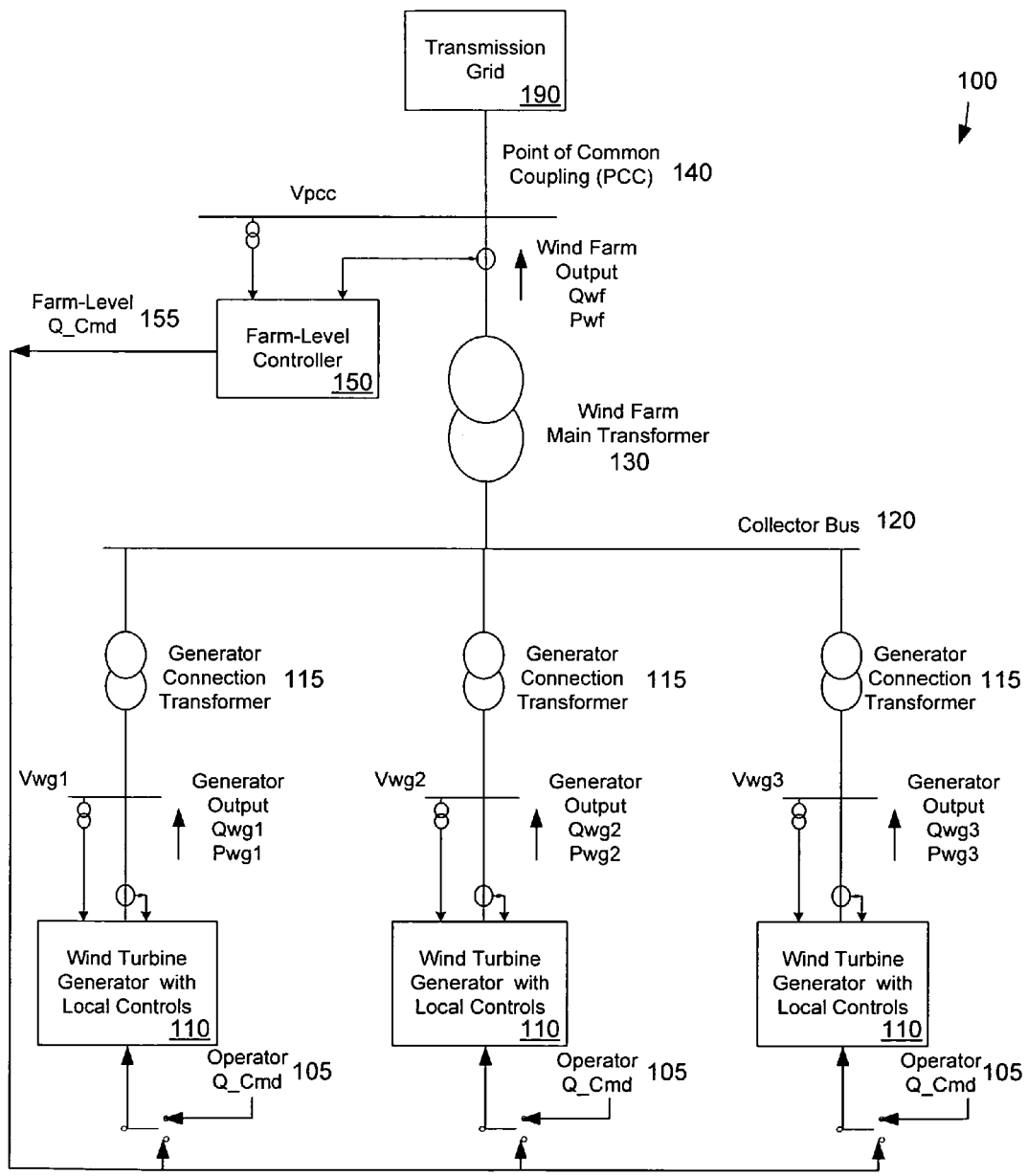
FIG. 1 is a block diagram of a wind farm having multiple wind turbine generators coupled with a transmission grid.

FIG. 1 is a block diagram of a wind farm having multiple wind turbine generators coupled with a transmission grid. FIG. 1 illustrates only three wind generators; however, any number of wind generators can be included in a wind farm.

Each wind turbine generator 110 includes a local controller that is responsive to the conditions of the wind turbine generator being controlled. In one embodiment, the controller for each wind turbine generator senses only the terminal voltage and current (via potential and current transformers). The voltage and current sensed are used by the local controller to provide an appropriate response to cause the wind turbine generator to provide the desired reactive power and voltage. A control system diagram corresponding to one embodiment of a wind turbine generator controller is described in greater detail below with respect to FIG. 2.

Each wind turbine generator 110 is coupled to collector bus 120 through generator connection transformers 115 to provide real and reactive power (labeled $P_{wg}$ and $Q_{wg}$, respectively) to collector bus 120. Generator connection transformers and collector buses are known in the art.

Wind farm 100 provides real and reactive power output (labeled $P_{wf}$ and $Q_{wf}$ respectively) via wind farm main transformer 130. Farm level controller 150 senses the wind farm output as well as the voltage at point of common coupling 140 to provide a farm level farm level reactive power command (Farm Level Q Cmd) 155. In one embodiment, farm level farm level controller 150 provides a single reactive power command to all wind turbine generators of wind farm 100. In alternate embodiments, farm level controller 150 provides multiple commands for subsets of wind turbine generators of wind farm 100. The commands to subsets of wind turbine generators can be based on, for example, additional information related to the operating conditions of one or more wind turbine generators.

Figure 2:
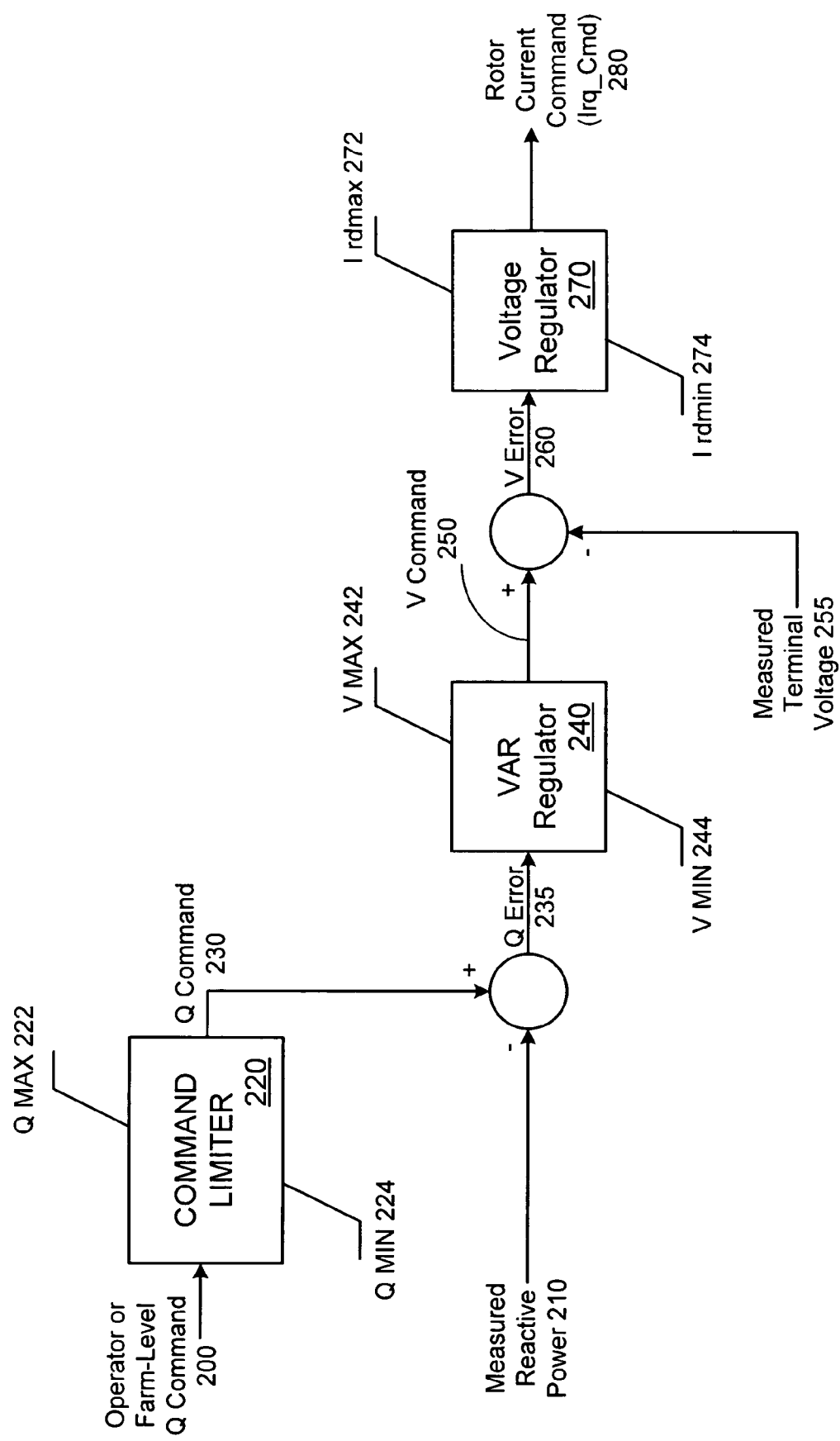
FIG. 2 is a control diagram of one embodiment of a wind turbine generator control system.

The control system of FIG. 2 provides an improved control structure involving both local and farm level farm level control to overcome the disadvantages of the prior art control architectures described above. The control system of FIG. 2 eliminates the requirement for fast and aggressive control from the wind farm level. Improved response is provided if the farm level control is out of service. In addition, efficient steady-state operation is achieved, while system dynamic response remains well within the limits set.

FIG. 2 is a control system diagram corresponding to one embodiment of a wind turbine generator control system. In one embodiment, the control system of a wind turbine generator generally includes two loops: a voltage regulator loop and a Q regulator loop. The voltage regulator loop operates relatively fast (e.g., 20 rad/sec) as compared to the Q regulator loop (e.g., greater than 1 second closed loop time constant). The Q regulator adjusts the set point of the voltage regulator.

Conceptually, the control system of FIG. 2 provides for wind turbine generator terminal voltage control by regulating the voltage according to a reference set by a higher-than-generator-level (e.g., substation or wind farm) controller. Reactive power is regulated over a longer term (e.g., several seconds) while wind turbine generator terminal voltage is regulated over a shorter term (e.g., less than several seconds) to mitigate the effects of fast grid transients.

Operator or farm level Q command 200 is a signal that indicates desired reactive power at the generator terminals. In farm level operation, the wind turbine generator Q command 200 is set equal to the output of the farm level control (line 155 in FIG. 1). In local control, the operator command is set manually, either at the wind generator location or at a remote location. Operator or farm level Q command 200 can be generated or transmitted by, for example, a computer system used to control the wind turbine generator. Operator or farm level Q command 200 can also come from a utility grid operator or substation.

In one embodiment, operator or farm level Q command 200 is transmitted to command limiter 220, which operates to maintain reactive power commands within a predetermined range. Qmax 222 and Qmin 224 indicate the upper and lower bounds on the reactive power command range.

The specific values used for $Q_{max}$ and $Q_{min}$ are based on, for example, generator reactive capability. In one embodiment the value for $Q_{max}$ is 800 kVAR and the value for $Q_{min}$ is −1200 kVAR for a 1.5 MW wind turbine generator; however, the specific values are dependent upon the capability of the generators being used.

The signal output by command limiter 220 is Q command 230, which is a command indicating the target reactive power to be produced. Q command 230 is in the range between $Q_{min}$ 224 and $Q_{max}$ 222. Q command 230 is compared to a signal indicating measured reactive power 210. The resulting error signal, Q error 235, indicates the difference between the measured reactive power and the commanded reactive power.

Q error 235 is an input signal to Q regulator 240, which generates V command 250 that indicates to a generator the reactive power to be provided by the generator. In one embodiment Q regulator 240 is a proportional integral (PI) controller that has a closed-loop time constant in the range of 1 to 10 seconds (e.g., 3 seconds, 5 seconds, 5.5 seconds). Other types of controllers can also be used, for example, proportional derivative (PD) controllers, proportional integral derivative (PID) controllers, state space controllers, etc. Other time constants can be used for Q regulator 240 provided that the time constant for Q regulator 240 is numerically greater than the time constant for voltage regulator 270.

V command 250 is limited to a predetermined range between $V_{max}$ 242 and $V_{min}$ 244. In one embodiment, $V_{max}$ 242 and $V_{min}$ 244 are defined in terms of percentage of rated generator output. For example, $V_{max}$ 242 can be 105% of rated generator voltage and $V_{min}$ 244 can be 95% of rated generator voltage. Alternate limits can also be used.

V command 250 is compared to a signal indicating measured terminal voltage 255 for the generator. The difference between V command 250 and measured terminal voltage 255 is voltage error signal 260. Voltage error signal 260 is the input signal to voltage regulator 270.

Voltage regulator 270 generates rotor current command 280, which is used to control generator rotor current. In one embodiment Q regulator 240 is a PI controller that has a closed-loop time constant of approximately 50 milliseconds. Other types of controllers can also be used, for example, PD controllers, PID controllers, etc. Other time constants can be used (e.g., 1 second, 20 milliseconds, 75 milliseconds, 45 milliseconds) for voltage regulator 270 provided that the time constant for voltage regulator 270 is less than the time constant for Q regulator 240.

In general, there are two components of a rotor current command. They are the real power component denoted as Irq_Cmd and the reactive power component denoted as Ird_Cmd. The rotor current command (240) generated as described with respect to FIG. 2 is the reactive component or Ird_Cmd command. The real component or Irq_Cmd can be generated in any manner known in the art. Rotor current command 280 is limited to $I_{rdmax}$ 272 and $I_{rdmin}$ 274. The values for $I_{rdmax}$ 272 and $I_{rdmin}$ 274 can be based on generator current ratings. For example, $I_{rdmax}$ 272 can be rated crest current for the generator rotor and $I_{rdmin}$ 274 can be a percentage of rated crest current for the generator rotor. Alternate limits can also be used.

Figure 3:
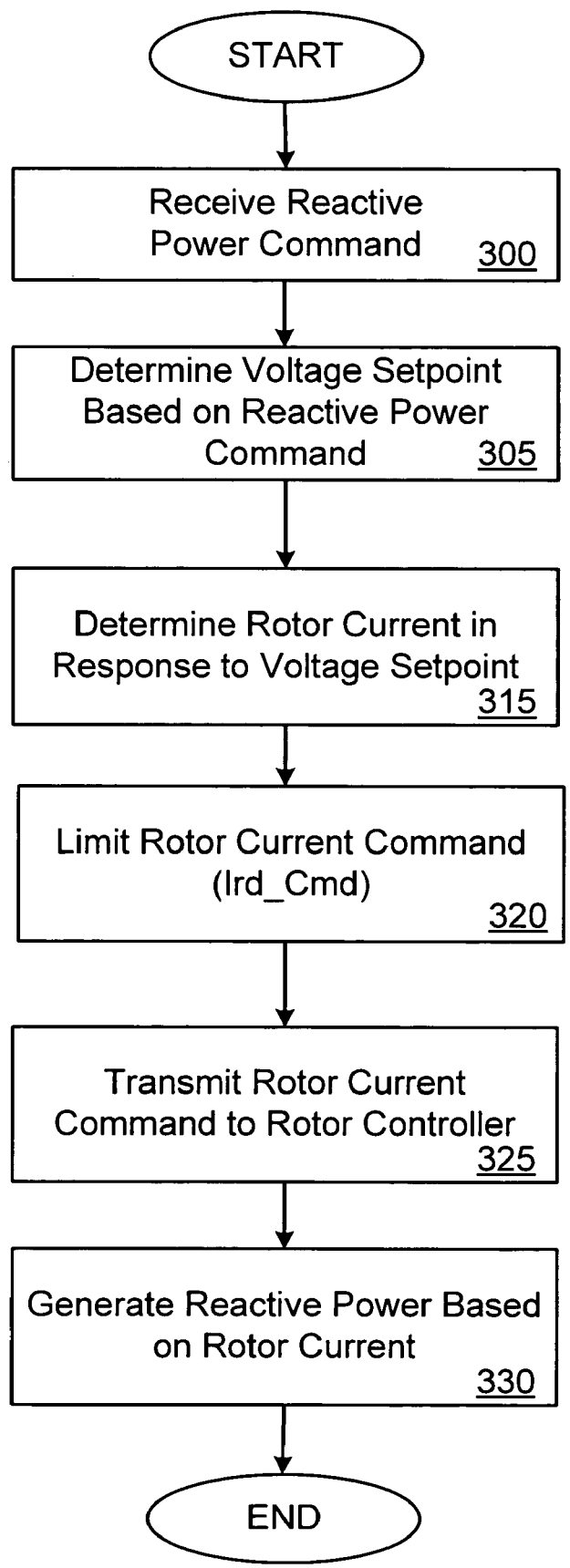
FIG. 3 is a flow diagram of one embodiment of operation of a wind turbine control system.

In one embodiment, all of the limits discussed with respect to FIG. 2 are non-windup limits; however, in alternate embodiments, a subset of the limits can be non-windup limits. The limits have been discussed in terms of fixed parameters; however, dynamically variable parameters provided by, for example, a lookup table or a processor or state machine executing a control algorithm can provide the limits. Such a dynamically variable limit may be based upon a current rating of the generator and a contemporaneous real power output FIG. 3 is a flow diagram of one embodiment of operation of a generator control system. A reactive power command is received, 300. As mentioned above, the reactive power command can be an Operator command, farm level command, or a local command.

A voltage setpoint is determined based on the reactive power command, 305. The voltage setpoint is limited to a range defined by upper and lower limits that are based on generator terminal voltage. In one embodiment, the limits are defined in terms of percentage of rated generator output. For example, the upper limit can be 105%, 110%, 102%, 115% of rated generator voltage and the lower limit can be 95%, 98%, 92%, 90%, 97% of rated generator voltage. Alternate limits can also be used.

A rotor current command for the generator is determined based on the voltage setpoint, 315. The rotor current command is limited, 320, to a range based on, for example, the current rating of the generator. For example, crest current ratings can be used for the limits, or percentages of crest current ratings can be used for the limits. The rotor current command is transmitted to the rotor controller, 325. The rotor controller causes the commanded current to be provided to the generator rotor. The generator then provides a reactive power output based on the rotor current provided, 330.

FIGS. 4 and 5 illustrate typical characteristic wind turbine generator operating behavior for prior art control systems. These plots show response of the wind turbine generators and of the total farm with and without fast farm level voltage control. The individual wind turbine generators are operated in constant power factor control with a setpoint to yield overexcited operation (as might be required to support the transmission system external to the wind farm). In FIGS. 4 and 5, the following variables are portrayed, from top to bottom (refer to FIG. 1 to see where these are on the wind farm): Pwg is the real power from an individual wind turbine generator, Qwg is the reactive power from the generator, Q_Cmd_Farm is the output of farm level controller (line 155 in FIG. 1), Vwg is the terminal voltage of the generator, Vpcc is the voltage at point of common coupling (140 on FIG. 1). The goal is generally to maintain Vpcc at a constant value even when the power fluctuates due to variations in wind speed.

FIG. 4 is prior art with local control only (i.e., Q_Cmd_Farm is constant). Note that the signal Vpcc varies considerably with power fluctuations Pwg, which is undesirable. FIG. 5 is prior art with farm level control activated. While Vpcc is much more stable than in FIG. 4, the control signal from the farm level varies considerably. This is because the farm level control must overcome the inherent adverse effects of the prior art local control.

Figure 6:
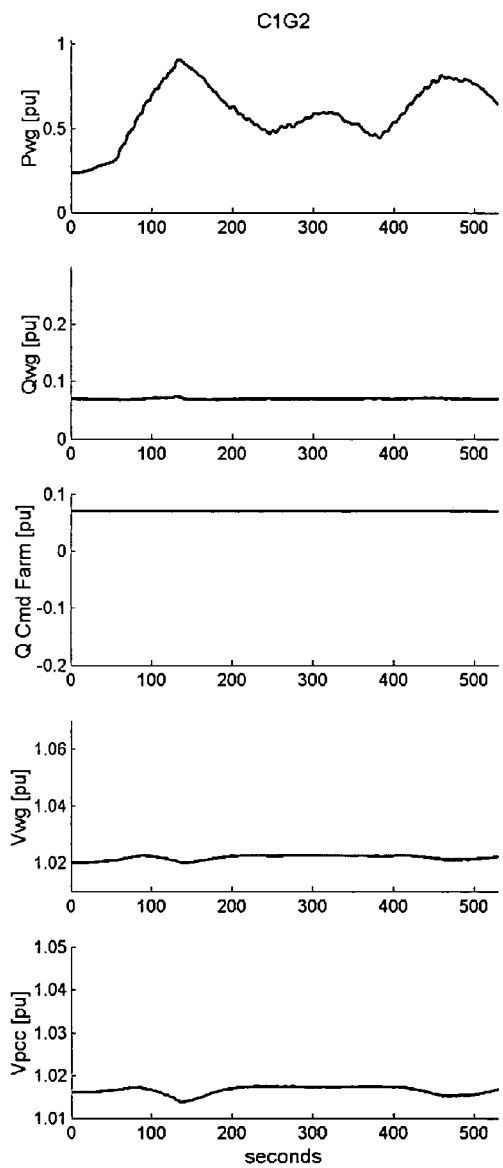
FIG. 6 is an example set of waveforms corresponding to local control of a wind turbine generator having a controller as described in FIG. 2, without wind farm level control.
Figure 7:
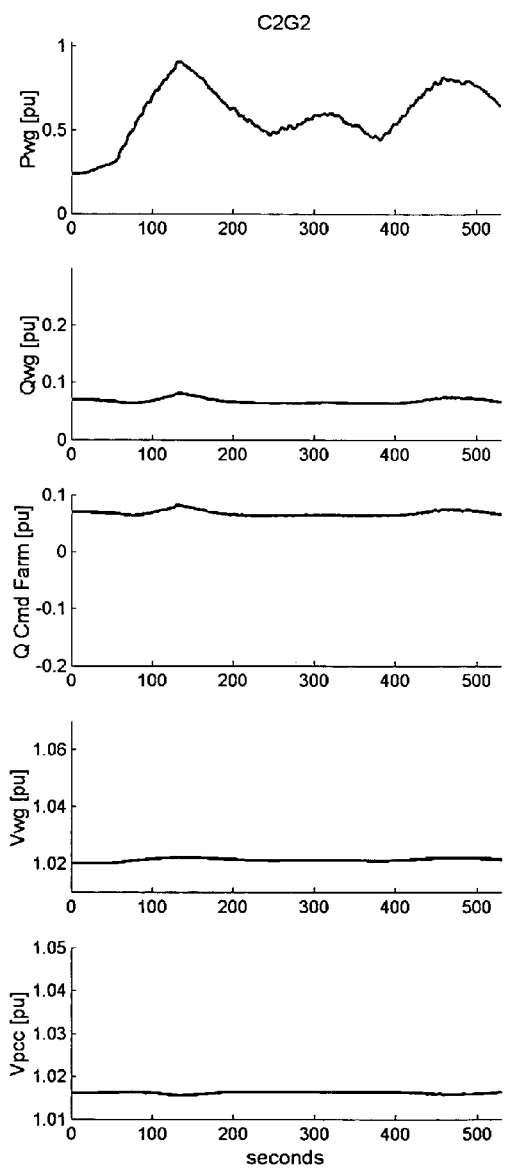
FIG. 7 is an example set of waveforms corresponding to local control in a wind turbine generator having a controller as described in FIG. 2, with wind farm level control.

FIGS. 6 and 7 are comparable to FIGS. 4 and 5, but with the control described in FIG. 2. The inherent response of the local control is generally relatively good, so that farm level control provides only trim control. Thus, the objective of allowing farm level control to be less aggressive and slower are achieved with the new control.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   receiving a reactive power command;
   determining a voltage set point based on the reactive power command, wherein the voltage set point is limited to a range of upper and lower limits based on generator terminal voltage by generating, with a reactive power regulator, the voltage set point to be transmitted to a voltage regulator and a time constant of the voltage regulator is numerically less than a time constant of the reactive power regulator;
   determining a rotor current command for the wind turbine generator in response to the voltage setpoint, wherein the rotor current command is limited to a range based on a current rating of the wind turbine generator and a contemporaneous real power output;
   transmitting the rotor current command to a rotor controller of the wind turbine generator; and
   generating a real and reactive power based on the rotor current command.

2. The method of claim 1 wherein the voltage set point based on the reactive power command is determined by a reactive power regulator.

3. The method of claim 1 wherein receiving the reactive power command comprises receiving a farm level reactive power command from a farm level controller that transmits reactive power commands to multiple wind turbine generators.

4. The method of claim 1 wherein receiving the reactive power command comprises receiving a reactive power command locally from a source providing a reactive power command for a single wind turbine generator.

5. The method of claim 1 wherein the lower limit comprises approximately 95% of steady-state rated generator voltage and the upper limit comprises approximately 105% of steady-state rated generator voltage.

* * * * *